Figure 1:
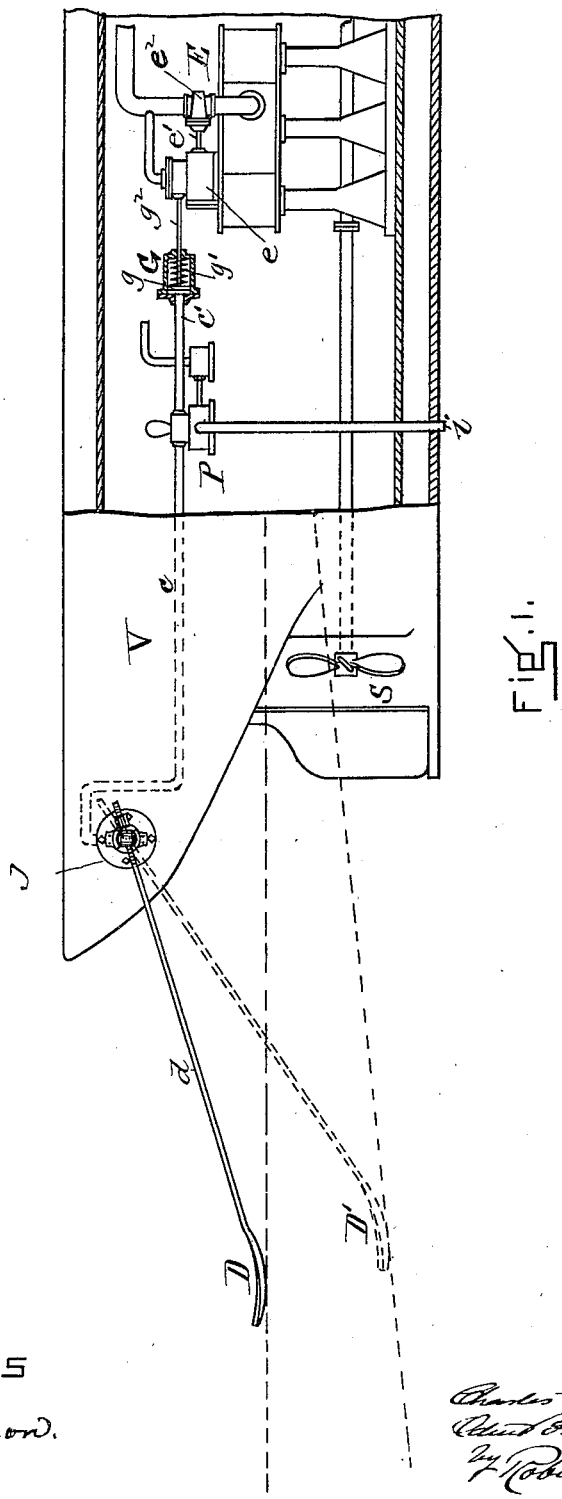

No. 663,493. Patented Dec. 11, 1900.
C. W. GOULD & O. B. ROBERTS.
MARINE ENGINE GOVERNOR.
(Application filed Jan. 24, 1900.)

(No Model.) 2 Sheets—Sheet 1.

WITNESSES
INVENTORS

No. 663,493. Patented Dec. 11, 1900.
C. W. GOULD & O. B. ROBERTS.
MARINE ENGINE GOVERNOR.
(Application filed Jan. 24, 1900.)

(No Model.) 2 Sheets—Sheet 2.

WITNESSES
E. F. Groll
J. G. O. Swanson

INVENTORS
Charles W. Gould
Odin B. Roberts
by Roberts & Bushman
Attorneys.

UNITED STATES PATENT OFFICE.

CHARLES W. GOULD, OF NEW YORK, N. Y., AND ODIN B. ROBERTS, OF DEDHAM, MASSACHUSETTS; SAID ROBERTS ASSIGNOR TO SAID GOULD.

MARINE-ENGINE GOVERNOR.

SPECIFICATION forming part of Letters Patent No. 663,493, dated December 11, 1900.

Application filed January 24, 1900. Serial No. 2,628. (No model.)

*To all whom it may concern:*

Be it known that we, CHARLES W. GOULD, a resident of New York, in the county and State of New York, and ODIN B. ROBERTS, a resident of Dedham, in the county of Norfolk and State of Massachusetts, citizens of the United States, have invented new and useful Improvements in Marine-Engine Governors, of which the following is a specification.

The object of this invention is the provision of means whereby the engine of a screw-propeller vessel may be governed with reference to the level of the water in which the propeller rotates, so that the undesirable and destructive behavior known as "racing" may be checked automatically. We are aware that sundry forms of apparatus have been contrived with this end in view, some of them involving the use of a pendulum in the vessel, swinging forward and aft, by which the incline of the vessel's pitch and the relative swing of the pendulum mediately or immediately operate the device for cutting off the power of the vessel's engine. In some apparatus which have been contrived to operate outside the vessel and to be acted upon directly by the sea itself there has been an arrangement proposed wherein a water-vane located on the vessel's quarter was mounted on a horizontal shaft in such manner that when the stern of the vessel rose and the vane was emersed it dropped by its own weight, and thereby operated the reducing mechanism which affected the vessel's engine and which when immersed resumed a horizontal position as the progress of the vessel caused the vane to drag through the water. Another proposed device consisted of a float rising and falling in a vertical tube placed outside the vessel just forward of the propeller, the movement of the float determining the operation of the power-cut-off mechanism. The common object of these several proposed apparatus has been to provide means by which the power applied to the screw-propeller shall be automatically cut off or reduced at a time when the stern of the vessel rises out of water by the pitching of the vessel and shall be automatically turned on again when the stern of the vessel again subsides into the water; but we are not aware that any of the devices which have come to our notice have proven practically successful, or, indeed, have been used at all. Power-regulating apparatus located within the vessel itself depend for their operation entirely upon the assumption that whenever the vessel pitches forward to a given angle the screw-propeller will be immersed. This is an assumption which fails to be realized in fact except under conditions which are not always fulfilled, because at a given angle of pitch the propeller may or may not be emersed, according to the length of the waves from crest to crest, so that what may typically be described as an "inboard" pendulum apparatus would have to be readjusted for each change in wave-length. This is obviously impracticable. With the external devices for operating the power cut-off the difficulty has been that none of these contrivances are capable of acting prophetically if located forward of the screw-propeller or more or less remotely therefrom and operated at a time when the propeller is actually rising out of water, so that racing of the screw begins before the operation of the cut-off device can check it.

Our invention herein described resembles prior devices only in that the actuating means by which the power cut-off is operated are external to the vessel and differs therefrom in this particular. Our invention is contrived so as to operate upon the power cut-off just before the propeller emerges from the water and also just before the propeller is finally immersed as the stern of the vessel subsides. Our invention has also this advantage: It is readily adjustable to variations of external conditions, so that after a short experience upon any individual vessel it can be determined precisely at what point of adjustment to set the device so as to get the best results.

While it is true that vessels suffer from racing of the propeller sometimes when pitching into a head sea, the difficulty is usually experienced when running before a following or quartering sea, in which the vessel when pitched forward runs with the sea, which causes the stern to be elevated for a relatively long period, while the crest of the sea passes the vessel and the succeeding wave-trough falls away from the propeller. To these conditions, therefore, the performance of our invention is addressed.

We employ, first, a water-level detector in the form of a float, which is suspended astern of the screw and may be extended twenty or thirty feet astern of the vessel. It does not matter what specific form of float or level-detector is used, so long as it is located in this position with reference to the screw-propeller. Probably in a vessel employing twin screws a float need not be further astern than vessel's counter, so long as the float of the level-detector is located well astern of the propeller itself.

As with the pitch of the vessel the float rises and falls its level or the act of passing a predetermined level is communicated to mechanism within the vessel, which is automatically actuated to cut off or diminish the power of the vessel's engine and to cause that power to be resumed consistently with the rise and fall of the stern and emersion or immersion of the screw. The automatic communication of the fact that the float is falling into the trough of the sea takes place just before emersion of the propeller and may be by mechanical or electrical devices; but this communication of existing outside conditions is effective in the measure that it is prophetic, and by our invention the level-detector outside the vessel communicates its automatic warning to the steam-engine just before the screw-propeller rises out of the water, so that power may be cut off and propeller and shaft allowed to move only by their own momentum in time to prevent racing. Again, the immersion of the screw is just preceded by the resumption of full power of the vessel's engine, so that the propeller loses no time in getting up speed.

The specific mechanism for communicating the position of the level-detector to the vessel's engine consists of a conduit through which a stream of water may be made to flow, a pump for keeping the stream in the conduit in motion, and a cut-off in the conduit operated by the level-detector, so that when a given position is reached by the detector the current of water will be suddenly checked. A device sensitive to increase in pressure is placed in communication with the conduit and with mechanism for varying the power exerted by the vessel's engine, so that the stoppage of the conduit by the cut-off operated by the level-detector instantly causes the pressure in the conduit to rise, the pump continuing to operate, and the increase in pressure sets a train of mechanism in motion which either throttles the steam-pipe or shortens the cut-off of the vessel's engine. The operation and responsive action of this arrangement will be prompt and effective. The water-hammer effect due to sudden stoppage of a current in a conduit assists in the communication of impulse to the engine cut-off mechanism.

Figure 2:
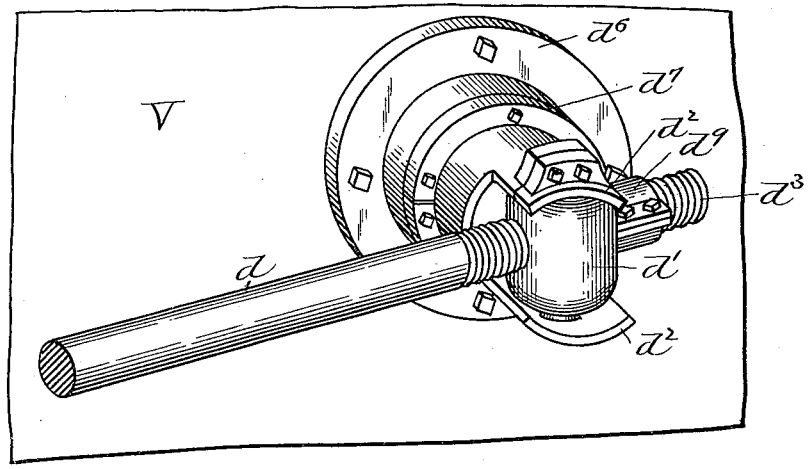
Figure 3:
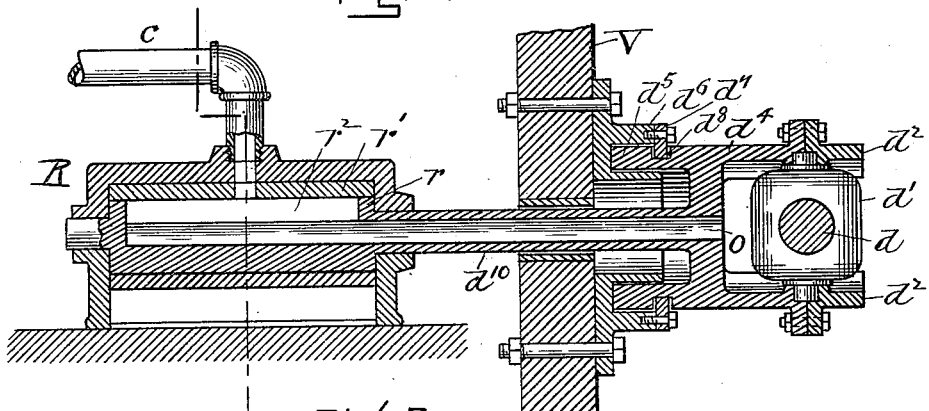
Figure 4:
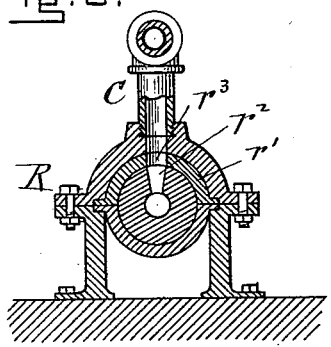

In the drawings, Figure 1 is a general view of the apparatus. Fig. 2 represents the outboard connection of the level-detector. Fig. 3 is a sectional view of the pivotal connection of the level-detector and the arrangement of the device for communicating the arrival of the level-detector to its cubical position. Fig. 4 is a cross-section of part of Fig. 3.

V, Fig. 1, is the stern of the vessel; E, its main engine; S, the screw-propeller, and D a float suspended from the quarter by a rod $d$. The mode of suspension at J will best be understood by reference to Figs. 2 and 3.

P represents a steam-pump which takes water at the point $i$ and pumps it continuously through the conduit $c$ to an outlet at J. A branch $e'$ leads from the pump to a governor G. This governor is a device sensitive to pressure in the conduit $c$ or branch $c'$ and consists of a cylinder containing a piston $g$, normally urged in one direction against pressure from the branch $c'$ by a spring $g'$. The piston-rod $g^2$ communicates with a slide-valve in the steam-chest which governs an ordinary steam-cylinder $e$. The piston-rod $e'$ of this cylinder $e$ is attached to a throttle-valve at $e^2$ or may control the link which governs the length of cut-off in the high-pressure cylinder of the engine E.

Referring now to Figs. 2 and 3, the float-rod $d$ passes through a pivot-block $d'$, which is pivotally mounted in the ears $d^2$ of a rock-shaft $d^4$, which has one bearing in the sleeve $d^5$, which turns in the annular socket of the bed-plate $d^6$ and is secured therein by the ring $d^7$, which enters the annular groove $d^8$. The plate $d^6$ is bolted to the side of the vessel V. The rock-shaft $d^4$ extends within the vessel, the part $d^{10}$ constituting both the means for transmitting the rocking movement of the shaft to mechanism presently to be described, but also as a waste-pipe terminating in the opening O.

The devices which communicate the position of the float D and its rod $d$ are represented in Figs. 3 and 4 by R. The inner shaft $d^{10}$ terminates in or is joined to a rotary valve $r$, which is seated in the valve-chest $r'$. The port $r^2$ in the valve $r$ communicates with the port $r^3$ in the valve-seat. The port $r^3$ is a continuation of the pipe $c$.

The float-rod $d$ is rendered adjustable by the arrangement shown in Fig. 2. The rod $d$ has cut in its surface a number of rings or a screw-thread at $d^3$, which slips freely in the pivot-block $d'$, which is not threaded. A clamp $d^9$, adapted to clasp the rod $d$ and be held firmly by the grooves with which the interior surfaces of the clamps $d^9$ register, secures the rod $d$ at any desired point. The mode of pivoting the rod on a universal joint provides for any probable movement.

The operation of the governing apparatus is as follows: The vessel V pitches and the float D takes the position indicated at D' in the trough of a sea. This movement rocks the shaft $d^4$, the extension $d^{10}$, and the valve $r$, closing the ports $r^2$ $r^3$. The pump P has been sending a continuous stream of water through conduit C out at O. This stream is checked suddenly by the closure of valve $v$, and the shock of closure, followed by the persistent working of the pump P, communicates pressure to the governor G, in which the piston $g$ moves against spring $g'$, opening the valve of cylinder $c$, and through the movement of piston $e'$ cutting off the steam from main engine E. When the stern of the vessel subsides, the float takes the position at D, the conduit $c$ is reopened, the stream flows freely, and the governor G being relieved of water-pressure returns the piston $g^3$ to its normal position, reverses the valve in the steam-chest of cylinder $e$, and thus turns on the power again.

What we claim, and desire to secure by Letters Patent, is—

1. In a marine-engine governor for propeller vessels, the combination of a power cut-off, means for operating the power cut-off, a wave-level detector, connections between the wave-level detector and the power cut-off operator whereby power is reduced when the detector passes a predetermined level, the said detector located astern of the propeller at such a distance that it passes the power-reducing point in the trough of a following sea before the said trough emerses the propeller.

2. In a marine-engine governor for propeller vessels, the combination of a power cut-off, means for operating the power cut-off, a wave-level detector, connections between the wave-level detector and the power cut-off operator whereby power is reduced when the detector passes a predetermined level, the said detector located astern of the propeller at such a distance that it passes the power-reducing point in the trough of a following sea before the said trough emerses the propeller, and means whereby the distance of the detector from the propeller may be adjusted to meet different conditions of wave-length.

3. In a marine-engine governor for propeller vessels, the combination of a power cut-off, means for operating the power cut-off, a wave-level detector, connections between the wave-level detector and the power cut-off operator whereby power is reduced when the detector passes a predetermined level in one direction, and resumed when the detector passes this level in the other direction, the said detector located astern of the propeller at such a distance that it passes the power-reducing point in the trough of a following sea before the said trough emerses the propeller, and means whereby the distance of the detector from the propeller may be adjusted to meet different conditions of wave-length.

4. In a marine-engine governer for propeller vessels, the combination of a power cut-off, means for operating the power cut-off, a wave-level detector, consisting of a float towed astern of the vessel by means of a rod, the said rod secured to the vessel by a flexible joint, and connections between the detector-towing rod and the power cut-off operator whereby power is reduced when the detector-float passes a predetermined level.

5. In a marine-engine governor for propeller vessels, the combination of a power cut-off, means for operating the power cut-off, a wave-level detector, consisting of a float towed astern of the vessel by means of a rod, the said rod secured to the vessel by a flexible joint, and connections between the detector-towing rod and the power cut-off operator whereby power is reduced when the detector-float passes a predetermined level, and means whereby the length of towing-rod may be adjusted to meet different conditions of wave-length.

6. In a marine engine for propeller vessels, a power cut-off, means for operating the power cut-off consisting of a float and its carrier, a conduit and means for maintaining a continuously-flowing stream of water in the conduit, connections between the float and the conduit whereby the fall of the float closes the conduit and arrests the flow of the water therein, and means whereby the increased pressure in the conduit due to said arrest of flow is communicated to and actuates a power cut-off of the vessel's engine.

In testimony whereof I have signed my name to this specification, in the presence of two subscribing witnesses, at New York, N. Y., this 2d day of January, 1900.

CHARLES W. GOULD.

Witnesses:
LLOYD McK. GARRISON,
JOHN L. WILKIE.

In testimony whereof I have signed my name to this specification, in the presence of two subscribing witnesses, at Boston, Massachusetts, this 23d day of January, 1900.

ODIN B. ROBERTS.

Witnesses:
E. F. GROLL,
S. G. O. SWANSON.